US011006161B1

(12) United States Patent
Ducloux et al.

(10) Patent No.: US 11,006,161 B1
(45) Date of Patent: May 11, 2021

(54) ASSISTANCE METADATA FOR PRODUCTION OF DYNAMIC OVER-THE-TOP (OTT) ADJUSTABLE BIT RATE (ABR) REPRESENTATIONS USING ON-THE-FLY (OTF) TRANSCODING (71) Applicant: Harmonic, Inc., San Jose, CA (US)

(72) Inventors: Xavier Ducloux, Rennes (FR); Khaled Jerbi, Rennes (FR); Bihong Huang, Rennes (FR); Darya Khaustova, Rennes (FR)

(73) Assignee: Harmonic, Inc., San Jose, CA (US)

( * ) Notice: Subject to any disclaimer, the term of this patent is extended or adjusted under 35 U.S.C. 154(b) by 192 days.

(21) Appl. No.: 16/212,278

(22) Filed: Dec. 6, 2018

Related U.S. Application Data (60) Provisional application No. 62/597,104, filed on Dec. 11, 2017.

(51) Int. Cl.
*H04N 21/266* (2011.01)
*H04N 21/2662* (2011.01)
*H04N 21/235* (2011.01)
*H04N 21/84* (2011.01)
*H04N 21/2343* (2011.01)

(52) U.S. Cl.
CPC ..... *H04N 21/2662* (2013.01); *H04N 21/2353* (2013.01); *H04N 21/234309* (2013.01); *H04N 21/84* (2013.01)

(58) Field of Classification Search
CPC ....... H04N 21/2662; H04N 21/234309; H04N 21/2353; H04N 21/84
See application file for complete search history.

(56) References Cited

U.S. PATENT DOCUMENTS

| | | | |
|---|---|---|---|
| 2010/0189183 A1* | 7/2010 | Gu ........................ | H04N 19/124 375/240.28 |
| 2011/0274179 A1* | 11/2011 | Holden .............. | H04N 21/6405 375/240.25 |
| 2012/0093238 A1* | 4/2012 | Holden ............ | H04N 21/23805 375/240.26 |
| 2014/0140417 A1* | 5/2014 | Shaffer .............. | H04N 21/8456 375/240.28 |
| 2016/0037176 A1* | 2/2016 | Chari .................... | H04L 65/601 375/240.26 |
| 2018/0035147 A1* | 2/2018 | DeVreese ............ | H04N 21/236 |

* cited by examiner

*Primary Examiner* — Nicholas T Corbo
(74) *Attorney, Agent, or Firm* — Brokaw Patent Law PC; Christopher J. Brokaw (57) ABSTRACT

Approaches for generating dynamic over-the-top (OTT) adjustable bit rate (ABR) representations of a video with a variable resolution and/or frame rate using on-the-fly (OTF) transcoding and assistance metadata. At an encoder located at a head-end, the encoder encodes a video stream at an initial bit rate and produces optimum representation (OpRep) metadata, which describes an optimum presentation for the video stream for each of a plurality of bit rates or the minimum bitrate below which a presentation becomes sub-optimal. The head-end transmits the encoded video stream and the OpRep metadata to a transcoder of a Content Delivery Network (CDN). The transcoder at the CDN uses the OpRep metadata to dynamically transcode the video stream in a preferred picture resolution and a preferred frame rate at a different bit rate than the initial bit rate using the OpRep metadata.

20 Claims, 6 Drawing Sheets

ASSISTANCE METADATA FOR PRODUCTION OF DYNAMIC OVER-THE-TOP (OTT) ADJUSTABLE BIT RATE (ABR) REPRESENTATIONS USING ON-THE-FLY (OTF) TRANSCODING

CLAIM OF PRIORITY

This application claims priority to U.S. provisional patent application No. 62/597,104, filed Dec. 11, 2017, invented by Xavier Ducloux et al., entitled "Assistance Metadata for Production of Dynamic OTT ABR Representations Using On-The-Fly Transcoding," the contents of which are hereby incorporated by reference for all purposes as if fully set forth herein.

FIELD OF THE INVENTION

Embodiments of the invention generally relate to approaches for improving On-The-Fly (OTF) transcoding using assistance metadata.

BACKGROUND

The trend of delivering and consuming video content over traditional IP networks continues to rise dramatically. This increase is in part due to the wide availability of VOD (Video On Demand) services and the multiplication of devices on which VOD content can be accessed. For example, video content may be accessed from various kinds of devices, such as smart phones, tablets, PCs, TVs, game consoles, and the like, which are connected through various types of networks (such as but not limited to broadcast, satellite, cellular, ADSL, and fiber).

Video content may be represented in different resolutions. Common resolutions available today include: 480i (720× 480 pixels split in two interlaced fields of 240 lines), 480p (720×480 pixels), 576i (720×576 pixels split in two interlaced fields of 288 lines), 576p (720×576 pixels), 720p (1280×720 pixels), 1080i (1920×1080 pixels split in two interlaced fields of 540 lines), 1080p (1920×1080 pixels), 2160p (3840×2160 pixels), and 4320p (7680×4320 pixels). The resolutions 720p, 1080i and 1080p are generally referred as "HD" (High Definition) or "HDTV" (High Definition Television), and the resolution 1080p is more specifically referred as "Full HD" (Full High Definition). Resolutions 2160p and 4320p are generally referred to as "UHD" (Ultra High definition) or "UHDTV" (Ultra High Definition Television), 2160p may be referred to as "4K UHD" (4 kilo Ultra High Definition) and 4320p may be more specifically referred to as "8 k UHD" (8 kilo Ultra High Definition).

Due to the large size of raw video, video content is generally stored and accessed in a compressed form. The most widely used video standards belong to the "MPEG" (Motion Picture Experts Group) family, which notably comprises the MPEG-2, AVC (Advanced Video Compression also called H.264) and HEVC (High Efficiency Video Compression, also called H.265) standards. Generally speaking, the more recent a video compression format is, the more features and better compression ratio it provides. For example, the HEVC format is more recent and a more advanced compression format than AVC, which is itself a more recent and a more advanced compression standard than MPEG-2. HEVC yields more encoding features and greater compression efficiency than AVC, and the same is true between AVC in relation to MPEG-2. The compression standards of the MPEG family are block-based compression standards. Other block-based compression standards exist, e.g., the Google formats VP8, VP9, and VP10 and the AV1 format developed by the Alliance for Open Media (AOM).

OTT (Over-The-Top) video delivery aims at delivering video content for any user of an IP network. In OTT video delivery, a video is available in a number of different representations. A representation is a particular set of digital data which may be interpreted to display a video in a particular manner. For example, a representation for a video may describe characteristics of the video, such as its video resolution, its bitrate, its compression format, encoding options, and packaging. A representation typically identifies for particular packaging for video content, such as a file format and an extension, as devices are generally not able to parse all possible file formats.

When a client wishes to view a video from an OTT delivery platform, the client receives information about the available representations for the video of interest. Such information may be delivered to the client in a manifest file. The video is split into a succession of small files, referred to as segments, which are encoded in all available representations. The client may then download and play the small files, or segments, in the representation of interest to enable the client to play the video. When the bandwidth available to a client changes, the client may download subsequent video segments encoded at a bit rate appropriate for the available bandwidth.

It is common for network conditions to vary and for different devices to have access to different amounts of network bandwidth. This may be in part due to the location of the device, but there are many reasons why network bandwidth may change over time. The current conditions of the network do affect the quality of the video capable of being transmitted over the network, as higher quality video requires additional bandwidth for transmission.

The large diversity in the capabilities of clients, video compression standards, resolutions, and available bit rates are but some of the factors that lead to the large combination of possible video types and formats that must be supported to serve a wide range of customers by OTT delivery platforms.

Digital video is typically delivered over an IP network using a Content Delivery Network (CDN). A CDN is generally composed of a large number of servers. An origin or headend server is responsible for producing the video content, which then may be delivered across the network to clients that requested the video content. When a geographical region has a sufficient number of clients connecting to the CDN, an edge server is generally deployed to assist with providing service to that region. The role of the edge server is to receive the requests from clients in a particular region and redirect those requests to the headend server of the CDN. While clients in a region may send multiple requests for the same video content, the edge server need only send one request for the video content to the headend server; once the edge server possess the requested video content from the headend server, the edge server may deliver the video content to any client that requests the video content in the geographical region for which the edge server is responsible. This approach thus has the advantage of saving bandwidth within the CDN between the headend and the edge servers.

Recall that OTT video delivery aims to deliver video content to any user of an IP network. It is possible to achieve OTT delivery by encoding and packaging all possible representations of the video on the headend server and thereafter sending a requested video over the CDN to a client upon request. However, such an approach would undesirably saturate the bandwidth and the storage of the CDN. This is so because each representation that has been requested by at least one client would be sent throughout the CDN, which results in a large amount of data being transit through the CDN. This negative impact would be compounded by the necessity to store data at a server while the data is being delivered. Consequently, if a large number of representations are sent across the CDN, then it must follow that a large number of OTT files will be stored on the servers, and particularly at edge servers, during the delivery of the video. Such storage requirements introduce severe scaling and cost considerations.

An approach which may be employed to address this quandary is Packaging On-The-Fly (POTF) and Transcoding On-The-Fly (TOTF), also named Just-In Time Packaging (JITP) and Just-In-Time Transcoding (JITT). For applications such as a Network Personal Video Recorder (NPVR), only the highest resolution of the video in a single packaging is transmitted from the headend to the edge servers. Then, this video content is packaged and transcoded "on the fly," or dynamically upon request, at each edge server to another video format or resolution according to the needs of the edge server to satisfy client requests. This approach advantageously reduces the bandwidth consumption between the headend and edge servers as well as reduces the storage capacities of edge servers.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for generating dynamic over-the-top (OTT) adjustable bit rate (ABR) representations using on-the-fly (OTF) transcoding and optimum representation (OpRep) metadata are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

New Encoding Paradigm Involving Optimum Representation Metadata

In prior art OTT delivery platforms, the encoded representations of video content are specified in terms of format (resolution and frame rate) and maximum bit rate. The maximum bit rate represents a high water mark for which an Adjustable Bit Rate (ABR) representation does not or should not exceed. A client of the OTT delivery platform may receive a list of available encoded representations of a video of interest through a playlist (for example, in the case of the HLS streaming format) or a manifest (for example, in the case of the DASH streaming format). The client may request an appropriate representation depending on its available bandwidth at a given time. Based on the available bandwidth, a representation may be identified that supports a maximum bit rate which will never exceed (or exceed rarely and very briefly) the available bandwidth available to the client. Since the format (resolution and frame rate) of an encoded representation for each maximum bit rate is statically configured in prior art OTT deployments, a dynamic change of format of the encoded representation for the requested bit rate never happens.

Next-generation OTT delivery platforms may evolve to provide greater flexibility and support higher video quality by defining only a list of maximum bit rates at which representations are to be delivered, thereby allowing a server of the OTT delivery platform to dynamically select the optimum format of a representation for a given bit rate. This selection made by the server may be performed in consideration of characteristics of the video content in some cases.

In such next-generation OTT services, the client, or end-user device, will receive a list of maximum bit rates for the encoded representations made available by the OTT delivery platform. The client will then request a representation depending on the available bandwidth at a given time. The resolution and frame rate need not be specified by the client for the requested representation at this stage. Instead, it is the responsibility of a transcoder at the OTT delivery platform to determine the appropriate resolution and frame rate of the requested encoded representation for the requested bitrate. If the client has some limitations in terms of supported resolution and frame rate, the client will have informed the OTT delivery platform of such limitations during the OTT service setup; therefore, the transcoder will not produce a representation which is not supported by the client.

In an embodiment of the invention, at an encoder located at a head-end, the encoder encodes a video stream at an initial bit rate and produces optimum representation (OpRep) metadata, which describes the optimum presentation for the video stream for each of a plurality of bit rates. The identification of the plurality of bit rates may be provided by the OTT delivery platform or may be anticipated or predicted by the encoder itself. If a particular client has some limitations in terms of supported resolution and frame rate, information about such limitations will be provided to the encoder by the OTT delivery platform. The head-end transmits the encoded video stream and the OpRep metadata to a transcoder of a Content Delivery Network (CDN). The transcoder may be an On-The-Fly (OTF) transcoder. The transcoder at the CDN uses the OpRep metadata to dynamically transcode the video stream in a preferred picture resolution and a preferred frame rate at a different bit rate than the initial bit rate using the OpRep metadata.

If all the representations can be stored on a server of the OTF delivery platform, the encoder can produce all the representations with the optimum format for each bit rate at any time. However, if a Transcoding On-The-Fly (TOTF) approach is used, then only the nominal representation at the highest bit rate supported by the OTT delivery platform will be encoded and stored on the server. Advantageously, the OTF transcoder may use the OpRep metadata to dynamically transcode the nominal representation into a preferred picture resolution and a preferred frame rate at a different bit rate using the OpRep metadata. These and other features and advantages will be discussed in greater detail below.

System Overview

Figure 1:
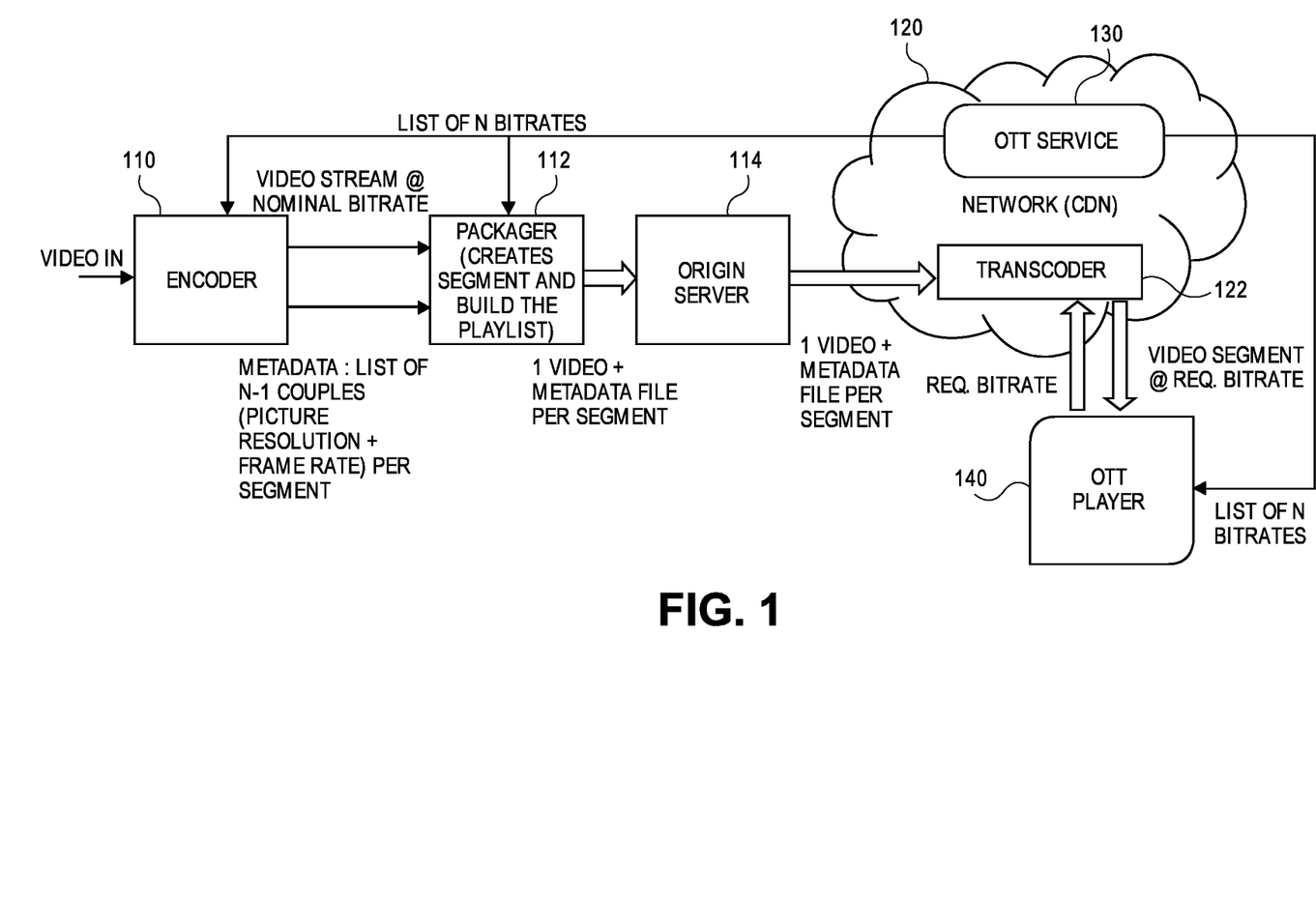
FIG. 1 is a block diagram of a system according to a first embodiment of the invention.

FIG. 1 is a block diagram of a system according to an embodiment of the invention. FIG. 1 depicts an encoder 110, packager 112, and origin server 114, each of which may be located at a headend. A headend is an industry-recognized term for a facility for receiving television signals for processing and distribution over a Content Delivery Network (CDN) 120. Non-limiting, illustrative examples of CDN 120 include a cable television system, a subscription digital video service (such as Netflix of Los Gatos, Calif.), an Internet video provider, and the like. CDN 120 may offer an Over-The-Top (OTT) video delivery service 130. As is well understood by those in the art, OTT delivery service 130 allows a client (depicted in FIG. 1 as OTT player 140) to request a digital video on demand from OTT service 130, whereupon receipt of the requested video, OTT player 140 may display the requested video.

OTT player 140 is meant to broadly represent any physical device which may execute software that is capable of requesting a video from OTT service 130, receiving the video from OTT service, and playing or displaying the video. While only one OTT player 140 is depicted in FIG. 1, any number of OTT players 140 may be employed with OTT service 130.

Encoder 110, as broadly used herein, is a component implemented in software that executes upon hardware, which encodes digital video in accordance with a particular codec. Encoder 110 functions differently than prior art encoders in that encoder 110 predicts an optimum format for each bit rate at which OTT service 130 makes available content for consumption. Encoder 110 encodes the source content at the highest bit rate at which OTT service 130 makes available content for consumption to produce a nominal video representation of OTT service 130 for that video.

Note that in the embodiment depicted by FIG. 1, OTT service 130 provides encoder 110 with a list of bit rates at which video content is made available by OTT service 130. In other embodiments which shall be discussed below, encoder 110 may not receive such information from OTT service 130.

In addition to generating the nominal video representation for a digital video, encoder 110 generates optimum representation (OpRep) metadata that describes an optimum presentation (picture resolution and frame rate) for each bit rate (other than that of the nominal representation) at which OTT service 130 makes available content for consumption. In an embodiment, encoder 110 may predict the optimum presentation for each bit rate using dedicated input video content characteristics.

In an embodiment, OpRep metadata may identify, for each bit rate at which OTT service 130 makes available content for consumption, a preferred picture resolution and a preferred frame rates. OpRep metadata may express this information in a variety of different manners and formats, e.g., OpRep metadata may comprise information arranged in a plurality of sets, where each member of the set includes (a) a preferred picture resolution, (b) a preferred frame rate, and an associated bit rate or an associated range of bit rates.

Packager 112, as broadly used herein, is a component implemented in software that executes upon hardware and which packages the digital video encoded by encoder 110. For example, packager 112 creates segments and builds the playlist.

Origin server 114, as broadly used herein, is a component implemented in software that executes upon hardware and which delivers the encoded video and the OpRep metadata from the headend to CDN 120. The encoded video and the associated OpRep metadata are processed at CDN 120 by transcoder 122.

Transcoder 122, as broadly used herein, is a component implemented in software that executes upon hardware and which transcodes requested digital video for OTT service 130. Transcoder 122 may encode a video representation in the appropriate format using the OpRep metadata for any request involving a bit rate lower than the one used for the nominal video representation that was provided to OTT service 130 by origin server 114.

Figure 2:
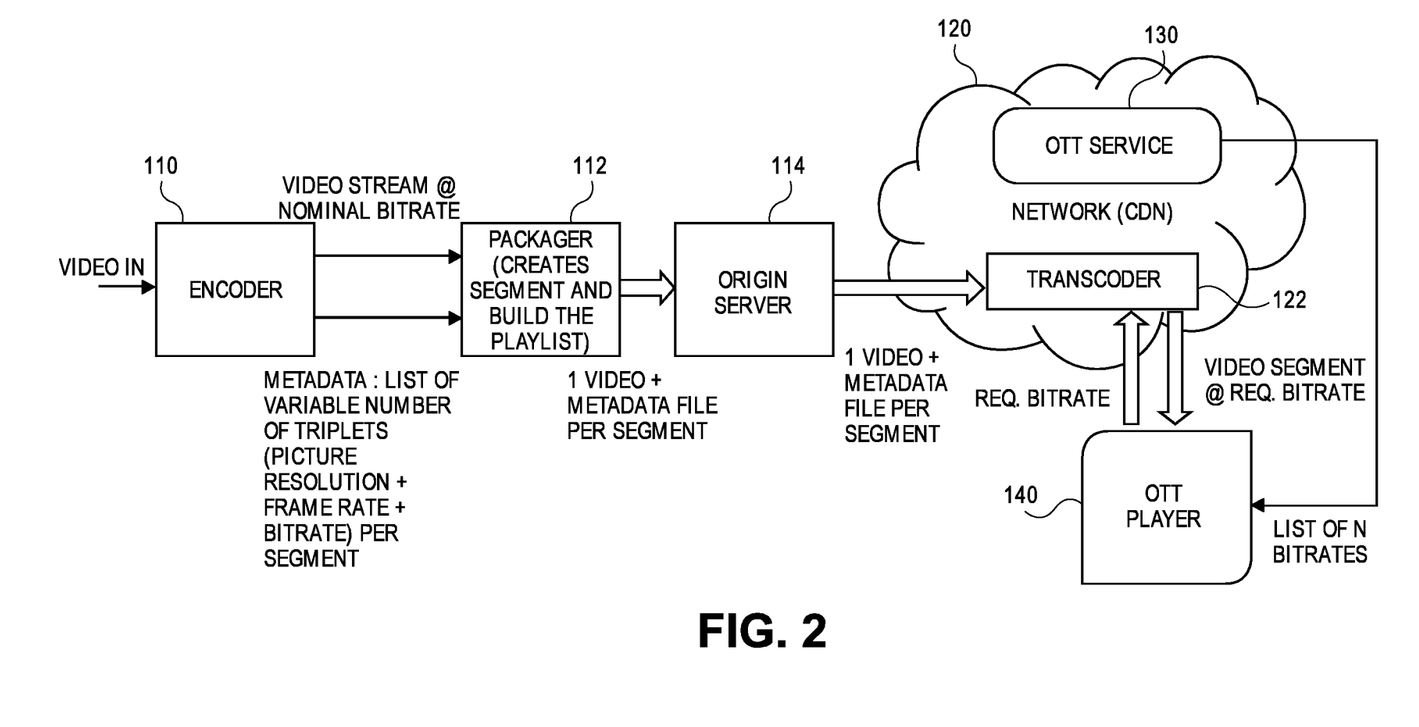
FIG. 2 is a block diagram of a system according to a second embodiment of the invention.

FIG. 2 is a block diagram of a system according to another embodiment of the invention. In the embodiment shown in FIG. 2, encoder 110 does not receive any information from OTT service 130 about the bit rates at which OTT service 130 makes video content available. Encoder 110 may receive information about the maximum resolution and frame rate supported by the clients of the OTT service. As a result, encoder 110 operates differently than in the previous embodiment. As input, encoder 110 has a list of video formats, which vary in terms of resolution and frame rate. Starting from the richest format (highest resolution and frame rate), encoder 110 can determine the lowest bitrate limit at which this format will be the optimum choice for the video quality. Below this limit, a simpler video format will offer a better choice. Encoder 110 may repeat this exercise with all the video formats down to the simplest available format to build a bit rate ladder as shall be described in greater detail below with reference to FIG. 4. Therefore, in this embodiment, OpRep metadata do not give optimum video format for a list of given bit rates, but a minimum acceptable bit rate for a list of given video formats. Transcoder 122 makes use of the bit rate ladder given by OpRep metadata to encode a video representation in the appropriate format for any request involving a bit rate lower than the one used for the nominal video representation that was provided to OTT service 130 by origin server 114.

Having described various components of the system, additional details will now be provided with respect to how OpRep metadata may be used to generating dynamic over-the-top (OTT) adjustable bit rate (ABR) representation using on-the-fly (OTF) transcoding.

Using Optimum Representation (OpRep) Metadata

Figure 3:
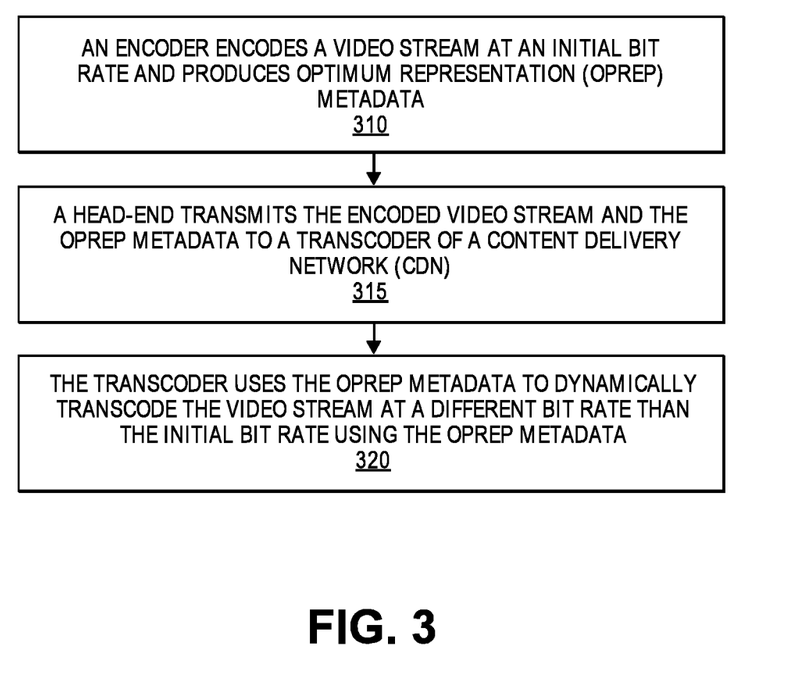
FIG. 3 is a flow chart of the steps of generating dynamic over-the-top (OTT) adjustable bit rate (ABR) representations using on-the-fly (OTF) transcoding and optimum representation (OpRep) metadata according to an embodiment of the invention.

FIG. 3 is a flow chart of the steps of generating dynamic over-the-top (OTT) adjustable bit rate (ABR) representations using on-the-fly (OTF) transcoding with OpRep metadata according to an embodiment of the invention. The steps of FIG. 3 will explain how OTT service 130 may respond for a request for a video from OTT player 140. Certain steps depicted in FIG. 3, such as steps 310 and 315, can occur prior to OTT player 140 issuing the request for a video to OTT service 130.

In step 310, encoder 110 encodes a video stream at an initial bit rate and produces optimum representation (OpRep) metadata. The initial bit rate at which the video stream is encoded may correspond to the highest bit rate make available by OTT service 130.

OpRep metadata describes an optimum presentation (resolution and frame rate) for the video stream for each of a plurality of bit rates. In an embodiment, OpRep metadata may be produced from multiple transcoding operations upon all the formats and bit rate combinations. OpRep metadata may also be produced by performing analysis on the input content characteristics using an efficient prediction model.

In certain embodiments, the identification of appropriate resolution and frame rate requires some analysis of the input content characteristics of the video stream and an efficient prediction model. In an embodiment, the prediction model of the best resolution and/or frame rate for a given bit rate may be a function of input content characteristics analyzed off-line using Machine Learning (ML) techniques. To that end, to develop the prediction model, a large variety of video source content may be encoded at different bit rates in each possible format in terms of resolution and frame rate. The video quality of the encoded content may be assessed using subjective viewing and objective video quality measures in the Machine Learning study. Input content characteristics of a video are extracted and Machine Learning techniques are used to ascertain links between input content characteristics and the optimum format for a given bitrate to build the prediction model.

Figure 4:
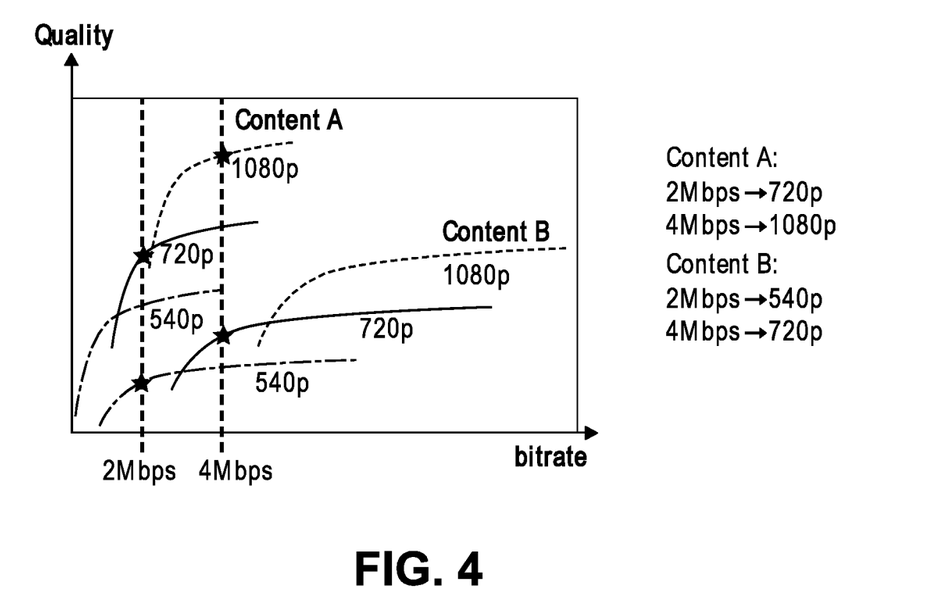
FIG. 4 is an illustration of some exemplary analysis performed to identify the recommended video format for a given bit rate according to an embodiment of the invention.

FIG. 4 is an illustration of some exemplary analysis performed to identify the recommended video format for a given bit rate according to an embodiment of the invention. FIG. 4 depicts data arranged in a graph that depicts the bit rate associated with a digital video (x-axis) vs. the quality of that digital video as expressed in resolution. FIG. 4 depicts exemplary data for two digital video labeled Content A and Content B. As FIG. 4 depicts, in an embodiment, the preferred picture resolution for a given bit rate may be ascertained by graphing various picture resolutions, and then selecting the particular picture resolution that yields that highest value for quality as the preferred picture resolution for that bit rate.

For example, different data sets are graphed in FIG. 4 for picture resolutions of 540p, 720p, and 1080p for Content A and for Content B. As shown in FIG. 4, the picture resolution having the highest video quality for Content A at 2M bps is at 720p; therefore, 720p is determined to be the preferred picture resolution at 2M bps for Content A. Note that while 1080p is a better picture resolution than 720p, it is nevertheless not selected as the preferred picture resolution for Content A at 2M bps because 1080p yields a lesser picture quality than 720p for Content A at 2M bps.

As another example, the picture resolution having the highest video quality for Content B at 4M bps in FIG. 4 is at 720p; therefore, 720p is determined to be the preferred picture resolution at 4 M bps for Content B. Note that while 1080p is a better picture resolution than 720p, it is nevertheless not selected as the preferred picture resolution for Content B at 4M bps because 1080p yields a lesser picture quality than 720p for Content B at 4M bps.

Figure 5:
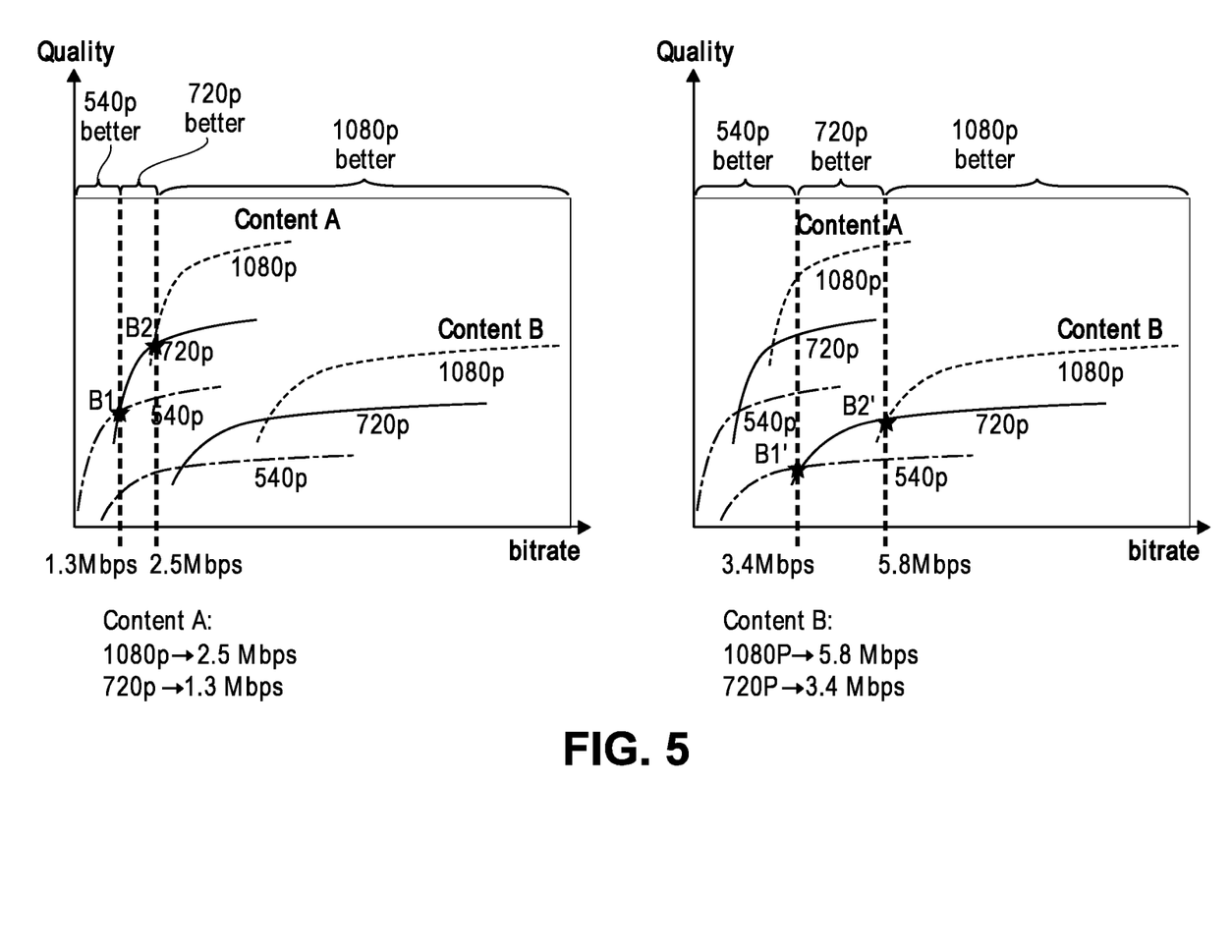
FIG. 5 is an illustration of some exemplary analysis performed to identify the the minimum bit rate for which a given video format maintains an advantage over a lower format according to an embodiment of the invention.

FIG. 5 is an illustration of some exemplary analysis performed to identify the minimum bit rate for which a given video format maintains an advantage over a lower format according to an embodiment of the invention. FIG. 5 depicts exemplary analysis that may be performed on each digital video to ascertain which picture resolution should be employed at particular bit rate.

For the sake of simplicity, FIGS. 4 and 5 depict exemplary analysis in terms of picture resolution, but the same approach may also be used to compare video format which differ in terms of frame rate to identify a preferred frame rate given a maximum bit rate for a particular digital video.

Encoder 110 is configured to extract certain characteristics of a digital video and select the best format for a given bit rate for each output segment of that digital video. In an embodiment, as it is better to avoid as much as possible an encoded format change within a scene as these changes may be visible to the view, the best format which is finally retained will not always be the one which provides the best objective video quality measure (if video characteristics changed within the scene).

In an embodiment, OpRep metadata generated by encoder 110 is composed of a list of picture resolution and frame rate for each of the bit rates OTT service 130 informs encoder 110 that it supports (except for the nominal bit rate for which the video stream at the appropriate format is directly sent to the server). In an embodiment where OTT service 130 does not inform encoder 110 at which bit rates it makes available content, then encoder 110 will predict the bit rate values below which a lower format (picture resolution and frame rate) becomes the nominal representation.

In step 315, origin server 114 transmits the encoded video stream and the OpRep metadata to CDN 120.

Note that steps 310 and 315 may be performed for each video made available by OTT service 130. Thus, OTT service 130 may store OpRep metadata for every video which may be requested by OTT player 140 from OTT service 130. If OTT player 140 requests a video from OTT service 130 in the nominal representation or a representation which OTT service 130 presently possesses, then OTT service 130 may forward the requested video to OTT player 130.

However, in many cases, OTT player 140 may request or require a segment or a representation which OTT service 130 does not currently possess. In such a case, to respond to this request, step 320 may be performed to obtain the requested representation of video or a segment thereof.

In step 320, transcoder 122 may use the OpRep metadata to transcode the video stream in a preferred picture resolution and a preferred frame rate at a different bit rate than the bit rate of the nominal representation (i.e., the bit rate at which the encoded video stream was received in step 315) using OpRep metadata associated with the video stream.

In an embodiment, OpRep metadata is associated to a given timed video segment using association mechanisms specified in each streaming format. Since OpRep metadata may be associated in this fashion with each segment, when transcoder 122 has need to transcode the video stream of the current segment at a lower bitrate than the nominal video stream received from origin server 114, transcoder 122 may consult the OpRep metadata associated with each segment to identify which format to use in the bit rate requested by OTT player 140.

In an embodiment, additional block-level OpRep metadata may be sent by encoder 110 for each output resolution to drive the re-encoding process at a much lower complexity than a full encoding process.

Embodiments of the invention provide many advantages and benefits. Using adaptive resolutions and frame rates for OTT ABR representations will enable higher quality digital video to be delivered to OTT players 140. More specifically, embodiments enable OTT service 130 to provide higher resolution for simple video content at low bitrates and less distortion for complex content encoded at low resolutions at high bitrates.

Advantageously, embodiments reduce the amount of transcoding operations in transcoder 122 if the input video is very simple, as the nominal video encoded at the highest resolution may be the most appropriate even at the lowest bitrate.

Moreover, the use of OpRep metadata computed at the headend to specify the optimum format for a given bit rate allows the deployment of such adaptive solutions without increasing the complexity at CDN 120.

Embodiments of the invention may be used in conjunction with block-level metadata which could drive the transcoding process and reduce drastically the complexity of the On-The-Fly Transcoder.

Hardware Mechanisms

Figure 6:
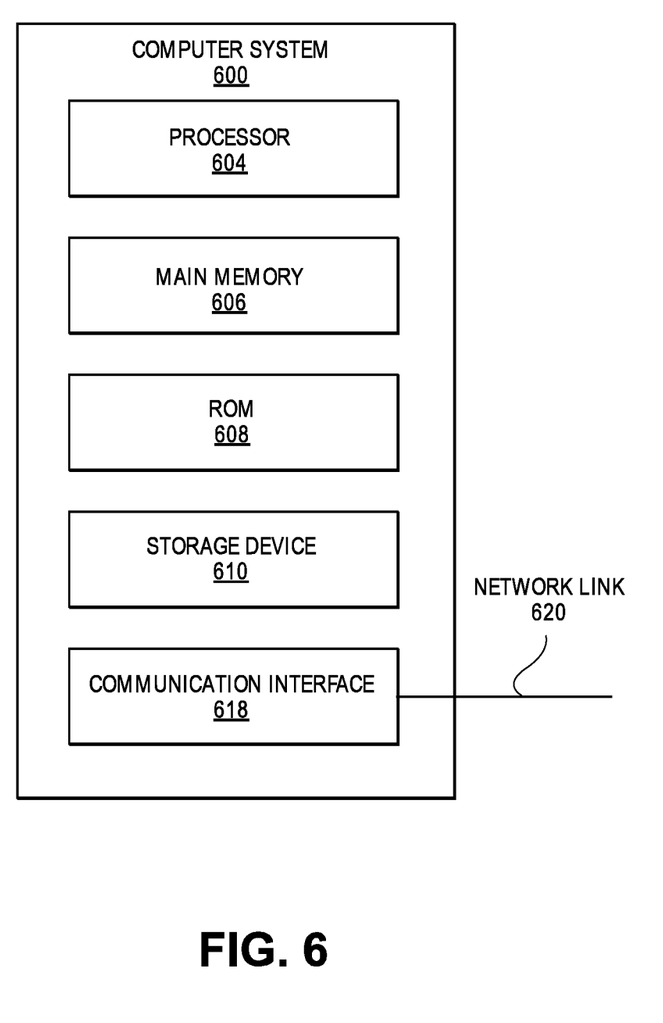
FIG. 6 is a block diagram that illustrates a computer system upon which an embodiment of the invention may be implemented.

Note that each of encoder 110, packager 112, origin server 114, transcoder 122, and OTT player 140 may be implemented, at least in part, by software that executes upon a computer system. In an embodiment, FIG. 6 is a block diagram that illustrates a computer system 600 upon which software performing one or more of the steps or functions discussed above may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display for displaying information to a user. An input device, including alphanumeric and other keys, may be coupled to computer system 600 for communicating information and command selections to processor 604. Other non-limiting, illustrative examples of an input device which may be used include a mouse, a trackball, or cursor direction keys for communicating direction information and command selections to processor 604 and for controlling cursor movement on display.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 604 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction and/or application. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for generating dynamic over-the-top (OTT) adjustable bit rate (ABR) representations using on-the-fly (OTF) transcoding and assistance metadata, which when executed by one or more processors, cause:

at an encoder located at a head-end, the encoder encoding a video stream at an initial bit rate and producing optimum representation (OpRep) metadata, wherein said OpRep metadata describes an optimum presentation for said video stream for each of a plurality of bit rates; and the head-end transmitting the encoded video stream and the OpRep metadata to a transcoder of a Content Delivery Network (CDN), wherein said transcoder is configured to use said OpRep metadata to dynamically transcode said video stream in a preferred picture resolution and a preferred frame rate at a different bit rate than said initial bit rate using said OpRep metadata, wherein said CDN informs the encoder as to a list of bit rates at which the CDN makes available the encoded video stream;

the encoder predicts a picture resolution and a frame rate for each bit rate in said list of bit rates; and the encoder generates the OpRep metadata to identify a predicted picture resolution and a predicted frame rate for each bit rate in said list of bit rates.

2. The one or more non-transitory computer-readable storage mediums of claim 1, wherein said encoder receives a list of bit rates for the ABR representations and said OpRep metadata identifies at least the following characteristics for each segment of the video stream encoded by the encoder for each of said plurality of bit rates: (a) picture resolution and (b) frame rate.

3. The one or more non-transitory computer-readable storage mediums of claim 1, wherein said encoder receives a list of video formats in a form of a picture resolution and frame rate but does not receive a list of bit rates for the ABR representations and said OpRep metadata identifies the following characteristics for each segment of the video stream encoded by the encoder for each of said plurality of video formats: (a) the minimum bitrate below which the video format is not optimal.

4. The one or more non-transitory computer-readable storage mediums of claim 1, wherein said CDN does not inform the encoder as to the list of bit rates at which the CDN makes available the encoded video stream, and wherein the one or more sequences of instructions further cause:

the encoder predicts a bit rate value below which a video format defined by a picture resolution and a frame rate becomes less optimal than other video format with lower picture resolution or frame rate; and the encoder generates the OpRep metadata to identify the minimum bit rate value for a list of video formats.

5. The one or more non-transitory computer-readable storage mediums of claim 1, wherein execution of the one or more sequences of instructions further cause:

the CDN storing, for said video stream, only a single representation encoded at the highest bit rate offered by the CDN; and the transcoder using the OpRep metadata to transcode the video stream to a pre-identified optimum representation for any bit rate lower than said initial bit rate.

6. The one or more non-transitory computer-readable storage mediums of claim 1, wherein an end-user device which requests a copy of the encoded video stream from the CDN, and wherein the transcoder or an entity working in conjunction with the transcoder at the CDN and not the end-user device determines the preferred picture resolution and the preferred frame rate at the different bit rate of the encoded video stream transmitted to said end-user device.

7. The one or more non-transitory computer-readable storage mediums of claim 1, wherein said encoder is configured to produce said OpRep metadata in a manner that seeks to avoid any changes in either said preferred picture resolution or said preferred frame rate in the middle of a scene.

8. The one or more non-transitory computer-readable storage mediums of claim 1, wherein said CDN informs the encoder of all compression standards and encoding profiles at which the CDN makes available the encoded video stream.

9. The one or more non-transitory computer-readable storage mediums of claim 1, wherein said CDN informs the encoder as to a set of potential end-user device characteristics, and wherein the one or more sequences of instructions further cause:

the encoder predicts a picture resolution and a frame rate or a bit rate for each of said set of potential end-user device characteristics.

10. An apparatus for generating dynamic over-the-top (OTT) adjustable bit rate (ABR) representations using on-the-fly (OTF) transcoding and assistance metadata, comprising:

one or more processors; and one or more non-transitory computer-readable storage mediums storing one or more sequences of instructions, which when executed, cause:

at an encoder located at a head-end, the encoder encoding a video stream at an initial bit rate and producing optimum representation (OpRep) metadata, wherein said OpRep metadata describes an optimum presentation for said video stream for each of a plurality of bit rates; and the head-end transmitting the encoded video stream and the OpRep metadata to a transcoder of a Content Delivery Network (CDN), wherein said transcoder is configured to use said OpRep metadata to dynamically transcode said video stream in a preferred picture resolution and a preferred frame rate at a different bit rate than said initial bit rate using said OpRep metadata, wherein said CDN informs the encoder as to a list of bit rates at which the CDN makes available the encoded video stream;

the encoder predicts a picture resolution and a frame rate for each bit rate in said list of bit rates; and the encoder generates the OpRep metadata to identify a predicted picture resolution and a predicted frame rate for each bit rate in said list of bit rates.

11. The apparatus of claim 10, wherein said encoder receives a list of bit rates for the ABR representations and said OpRep metadata identifies at least the following characteristics for each segment of the video stream encoded by the encoder for each of said plurality of bit rates: (a) picture resolution and (b) frame rate.

12. The apparatus of claim 10, wherein said encoder receives a list of video formats in a form of a picture resolution and frame rate but does not receive a list of bit rates for the ABR representations and said OpRep metadata identifies the following characteristics for each segment of the video stream encoded by the encoder for each of said plurality of video formats: (a) the minimum bitrate below which the video format is not optimal.

13. The apparatus of claim 10, wherein said CDN informs the encoder as to the list of bit rates at which the CDN makes available the encoded video stream, and wherein the one or more sequences of instructions further cause:
the encoder predicts a picture resolution and a frame rate for each bit rate in said list of bit rates; and
the encoder generates the OpRep metadata to identify a predicted picture resolution and a predicted frame rate for each bit rate in said list of bit rates.

14. The apparatus of claim 10, wherein said CDN does not inform the encoder as to the list of bit rates at which the CDN makes available the encoded video stream, and wherein the one or more sequences of instructions further cause:
the encoder predicts a bit rate value below which a video format defined by a picture resolution and a frame rate becomes less optimal than other video format with lower picture resolution or frame rate; and
the encoder generates the OpRep metadata to identify the minimum bit rate value for a list of video formats.

15. The apparatus of claim 10, wherein execution of the one or more sequences of instructions further cause:
the CDN storing, for said video stream, only a single representation encoded at the highest bit rate offered by the CDN; and
the transcoder using the OpRep metadata to transcode the video stream to a pre-identified optimum representation for any bit rate lower than said initial bit rate.

16. The apparatus of claim 10, wherein an end-user device which requests a copy of the encoded video stream from the CDN, and wherein the transcoder or an entity working in conjunction with the transcoder at the CDN and not the end-user device determines the preferred picture resolution and the preferred frame rate at the different bit rate of the encoded video stream transmitted to said end-user device.

17. The apparatus of claim 10, wherein said encoder is configured to produce said OpRep metadata in a manner that seeks to avoid any changes in either said preferred picture resolution or said preferred frame rate in the middle of a scene.

18. The apparatus of claim 10, wherein said CDN informs the encoder as to a set of potential end-user device characteristics, and wherein the one or more sequences of instructions further cause:
the encoder predicts a picture resolution and a frame rate or a bit rate for each of said set of potential end-user device characteristics.

19. A method for generating dynamic over-the-top (OTT) adjustable bit rate (ABR) representations using on-the-fly (OTF) transcoding and assistance metadata, comprising:
at an encoder located at a head-end, the encoder encoding a video stream at an initial bit rate and producing optimum representation (OpRep) metadata, wherein said OpRep metadata describes an optimum presentation for said video stream for each of a plurality of bit rates; and
the head-end transmitting the encoded video stream and the OpRep metadata to a transcoder of a Content Delivery Network (CDN), wherein said transcoder is configured to use said OpRep metadata to dynamically transcode said video stream in a preferred picture resolution and a preferred frame rate at a different bit rate than said initial bit rate using said OpRep metadata, wherein said CDN informs the encoder as to a list of bit rates at which the CDN makes available the encoded video stream;
the encoder predicts a picture resolution and a frame rate for each bit rate in said list of bit rates; and
the encoder generates the OpRep metadata to identify a predicted picture resolution and a predicted frame rate for each bit rate in said list of bit rates.

20. The method of claim 19, wherein said CDN informs the encoder as to a set of potential end-user device characteristics, and wherein the method further comprises:
the encoder predicting a picture resolution and a frame rate or a bit rate for each of said set of potential end-user device characteristics.

* * * * *